Aug. 10, 1954    W. J. CLEMENTS    2,685,744
DEVICE FOR CLOSE-UP WORK WITH CAMERAS
Filed June 24, 1952
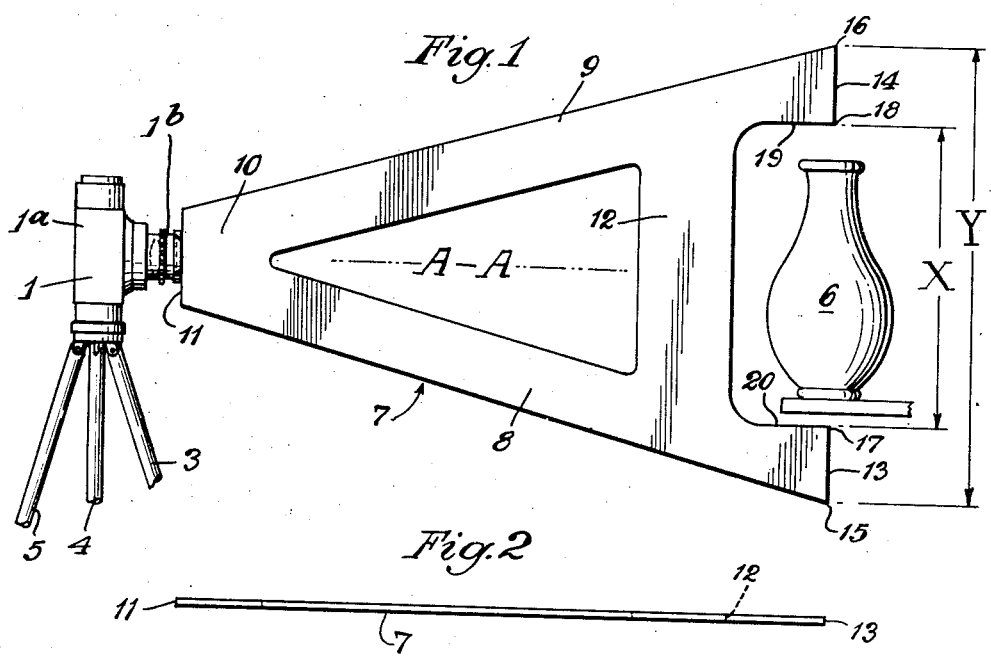
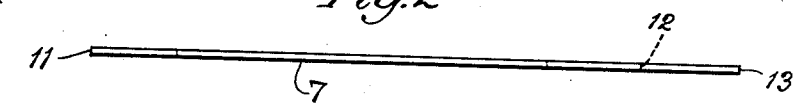
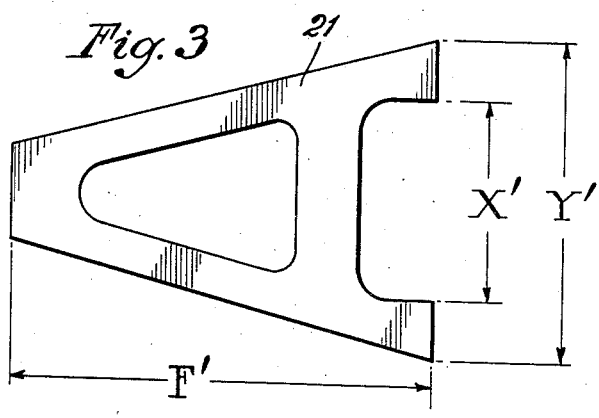
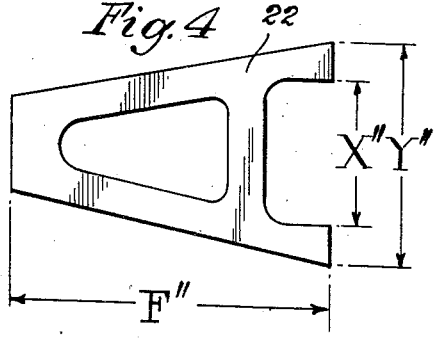
Inventor
William J. Clements
by Parker & Carter
Attorneys Patented Aug. 10, 1954

2,685,744

UNITED STATES PATENT OFFICE 2,685,744

DEVICE FOR CLOSE-UP WORK WITH CAMERAS

William J. Clements, Hinsdale, Ill., assignor to Clements Mfg. Co., Chicago, Ill., a corporation of Illinois Application June 24, 1952, Serial No. 295,197

3 Claims. (Cl. 33—174)

This invention is directed to a novel template for use with cameras.

It is an object of this invention to provide a template for use with cameras which will accurately define the distance between the camera and its object and which provides a novel means for determining the field of the camera.

Another object of this invention is the provision of a camera template which is simple to construct or manufacture and also presents a rugged and sturdy construction.

Another object of this invention is to construct a camera template which embodies a novel method for defining the field embraced by a camera with which the template is used.

Another object of my invention is to provide a portable camera template which may be handled and used with facility and which may be conveniently packed in a carrying case.

Other objects will appear from time to time in the course of the ensuing specification and claims.

Referring generally now to the drawings, Figure 1 represents an elevational view of my camera template as employed with a typical camera and camera object.

Figure 2 is a plan view of the template shown in Figure 1.

Figure 3 is an elevational view of another embodiment of template employing the same principles of construction shown in Figure 1.

Figure 4 is another elevational view of another embodiment of the template shown in Figure 1 utilizing the same principles of construction shown in Figure 1.

With specific reference now to the drawings wherein like parts are designated by like numerals throughout, and referring in the first instance to Figure 1, I designates a typical camera of conventional construction supported upon a tripod 2 having the usual supporting legs 3, 4, and 5. The camera I includes the usual frame 1a and lens 1b. Designated at 6 is an object, such as a vase, which is being photographed by the camera I. 7 represents my novel template as used in defining the focal length of the lens used with the camera and the field taken by the lens of the camera.

In close work with a camera it is conventional practice to place the camera at a distance from the object which is equal to the focal length of the particular lens used with the camera. When utilizing a camera for closeup work, it is extremely important that the distance between the camera and the object being reproduced by the camera be accurately determined. At the same time it is highly important that the photographer taking the picture of the object knows exactly what will be encompassed or enclosed in the field of the camera at that focal length. The template or templates as shown and described herein provide a means for both determining the focal length accurately while at the same time accurately defining the field.

The template 7 is comprised of a generally triangular shaped unitary flat member having diverging leg portions 8 and 9. The two leg portions of the device terminate at one end in an apex 10 which has an end surface 11 adapted to be disposed adjacent the lens 1b of the camera. A transverse reinforcing member 12 joins the two leg portions adjacent the other ends of the legs, defining an opening between the legs and member 12. Each one of the leg portions 8 and 9 diverges from the longitudinal axis A—A of the template at an equal angularity.

The legs 8 and 9 terminate at their other ends in a pair of co-planar surfaces 13 and 14 disposed generally perpendicular to the longitudinal axis A—A of the template. The distance between the outer ends 15 and 16 of the surfaces 13 and 14 is such that it defines the vertical dimension Y of the field of the camera. The distance between the inner ends 17 and 18 of the surfaces 13 and 14 is such that it defines the horizontal dimension X of the field of the camera. It will be readily understood that reference to the vertical dimension and horizontal dimension is by way of example only. That is to say, the distances X and Y define two dimensions of the camera field. The dimensions which the distances X and Y represent depend upon whether the camera is disposed vertically as shown in Figure 1 or horizontally. It will be apparent, therefore, that when the camera is disposed horizontally, the longer distance Y will define the horizontal dimension of the field while the shorter distance X will define the vertical dimension of the field.

The focal length of the particular lens used with the camera is represented by the distance between the end surface 11 and the end surfaces 13 and 14, measured parallel to axis A—A. When the end surface 11 is brough adjacent to the camera lens, as shown in Figure 1, an object placed adjacent the end surfaces 13 and 14 will thus be at a distance equal to the focal length of the lens away from the lens.

Inwardly extending surfaces 19 and 20 are disposed generally parallel with the longitudinal axis of the template and join the inner ends 17 and 18 of the end surfaces with the reinforcing member 12. The inwardly extending surfaces 19 and 20 together with the reinforcing member 12 present a recessed opening which provides for a degree of flexibility of the device. For example, it is desirable under some circumstances to have the side of the object which is nearest the camera at a distance somewhat less than the focal length while at the same time having other portions of the object at a somewhat greater distance from the focal length. A camera lens will normally reproduce a clear image at a distance which is a small amount less than the focal length and also at a distance which is a small amount greater than the focal length. The recessed opening then, provides a means for moving an object within this range of distances, while continuing to employ the template.

In Figures 3 and 4, we have shown modifications of the template shown in Figure 1 which embody the same general principles of construction as the template shown in Figure 1. In closeup work with cameras, such as is accomplished in some instances by 35 mm. cameras, several lenses are employed with each camera. Each of these lenses provides a different focal length for the camera and each will define a different field at those focal lengths. In Figure 3 a template 21 is shown having leg portions defining the dimensions of the field X' and Y' at a focal length F'. In Figure 4 a template 22 is shown having leg portions defining the dimensions of the field X" and Y" at a focal length F". Each template is used for a different lens and the plurality of templates may be employed by the photographer as a set having one template for each lens.

The use and operation of the templates are as follows:

Assuming that the camera is in position, the object 6 is first brought into the proximity of the camera lens. The template 9 is brought into position as shown in Figure 1 with the surface 11 disposed adjacent to the camera lens and with the axis A—A of the template co-linear with the axis of the lens. The object 6 is then brought into the proper focal length as defined by the distance between the end surfaces 11 and 13, 14 of the template. The plane of the template is first disposed vertically to define the vertical dimension Y of the field and is then rotated through 90° into a generally horizontal position to define the horizontal dimension X of the field.

When the field has thus been determined, the object 6 may be moved vertically or horizontally to insure proper positioning of the object in the camera field. Where desirable, the object 6 may be moved to a distance slightly less than the focal length of the lens used in accordance with the individual desires of the photographer.

When it is desired to photograph an object at a smaller distance with a lens having a smaller focal length, the individual templates 21 or 22 may be employed. It will be apparent that an individual template is employed for each different lens.

The templates as shown present an extremely sturdy construction and take up a relatively small amount of space, thus facilitating packing in a photographer's case or the like. The templates serve to accurately define the distance from the camera to the object and at the same time indicate positively the field being photographed.

The template may be conveniently used in the field to photograph objects of nature such as flowers. When so used, the template may be brought into position with the end surfaces 13 and 14 defining the object or field photographed and the camera lens brought up into a position in alignment with the longitudinal axis of the template and at a distance from the object equal to the focal length as represented by the distance F between the surfaces 11 and 13, 14.

If desired, suitable indicia may be inscribed on the apex 10 and member 12 to indicate the longitudinal axis A—A of the templates and to insure alignment of the axis of the camera lens, longitudinal axis of the template, and center of the camera field.

Although I have shown an operative form of my invention, it will be recognized that many changes in the form, shape and arrangement of parts can be made without departing from the spirit of the invention, and my showing is, therefore, to be taken as, in a sense, diagrammatic, and not in any limiting sense, and the invention herein should be limited only as defined by the scope of the hereinafter appended claims. For example, where desired, the legs of the templates may be made of telescoping sections, and the transverse reinforcing member may be made of telescoping sections in order to permit the use of one adjustable template for a plurality of lenses.

I claim:

1. A template for use with cameras including a generally flat body member having diverging leg portions, said leg portions terminating at one end in an apex adapted to be disposed adjacent to a camera lens and terminating at their other ends in spaced surfaces having outer and inner end portions, said other end surfaces being formed and adapted to define the horizontal and vertical dimensions of the field of a camera by the distance between said outer end portions and the distance between said inner end portions respectively, and the distance between the apex surface and the other end portions of the legs being of a length conforming to the focal length of a camera lens.

2. A camera template including an elongated body portion of a length conforming to the focal length of a camera lens, said body portion including an end portion adapted to be disposed adjacent to a camera lens and an opposite end portion having spaced surfaces formed and adapted to define both the horizontal and vertical dimensions of the field of the camera at the said focal length.

3. A camera template including a generally elongated body portion of a length conforming to the focal length of a camera lens with which a camera is to be used, said body including a surface at one end of the body disposed transversely to the longitudinal axis of the body and adapted to be disposed adjacent to the camera lens, said body portion including an opposite end portion presenting a pair of spaced surfaces generally transverse to the longitudinal axis of the body, said end surfaces having outer ends to present and define an outer dimension taken transversely of the longitudinal axis conforming to one of the dimensions of the camera field, the end surfaces having inner ends presenting and defining an inner dimension taken transversely of the longitudinal axis of the body conforming to another dimension of the field taken by the camera.

References Cited in the file of this patent

UNITED STATES PATENTS

| Number | Name | Date |
|---|---|---|
| 82,917 | Brooks | Oct. 13, 1868 |
| 2,470,635 | Moss | May 17, 1949 |
| 2,495,975 | Kelly | Jan. 31, 1950 |

FOREIGN PATENTS

| Number | Country | Date |
|---|---|---|
| 19,816 | Australia | Oct. 21, 1935 |